(12) United States Patent
Li et al.

(10) Patent No.: US 10,470,266 B1
(45) Date of Patent: Nov. 5, 2019

(54) LED DIMMING LOAD SUDDEN CHANGE SUPPRESSION CIRCUIT

(71) Applicant: Si En Technology (Xiamen) Limited, Xiamen, Fujian (CN)

(72) Inventors: Yunfeng Li, Xiamen (CN); Liping Xiu, Xiamen (CN)

(73) Assignee: SI EN TECHNOLOGY (XIAMEN) LIMITED, Xiamen, Fujian (CN)

( * ) Notice: Subject to any disclaimer, the term of this patent is extended or adjusted under 35 U.S.C. 154(b) by 0 days.

(21) Appl. No.: 16/188,135

(22) Filed: Nov. 12, 2018

(51) Int. Cl.
*H05B 33/08* (2006.01)

(52) U.S. Cl.
CPC ....... *H05B 33/0851* (2013.01); *H05B 33/083* (2013.01); *H05B 33/0815* (2013.01)

(58) Field of Classification Search
CPC .............. H05B 33/0851; H05B 33/083; H05B 33/0815

USPC .......................................................... 315/193
See application file for complete search history.

(56) References Cited

U.S. PATENT DOCUMENTS

| | | | |
|---|---|---|---|
| 9,584,022 B1* | 2/2017 | Galvano | H02M 3/158 |
| 2010/0102756 A1* | 4/2010 | Shin | H05B 33/0815 315/297 |
| 2013/0134889 A1* | 5/2013 | Chen | H05B 33/0815 315/193 |
| 2017/0170727 A1* | 6/2017 | Mizuno | H02M 3/156 |

* cited by examiner

*Primary Examiner* — Daniel D Chang
(74) *Attorney, Agent, or Firm* — Leong C. Lei (57) ABSTRACT

An LED dimming load sudden change suppression circuit is applied to an LED dimming circuit. The LED dimming load sudden change suppression circuit includes a MOS transistor Q1, a sampling resistor R1, an error amplifier U1, and a DC-DC module U2, which can ensure that the total current of the LED dimming circuit is constant and avoid damage to LEDs.

5 Claims, 6 Drawing Sheets

LED DIMMING LOAD SUDDEN CHANGE SUPPRESSION CIRCUIT

BACKGROUND OF THE INVENTION

1. Field of the Invention

The present invention relates to an LED light, and more particularly to an LED dimming load sudden change suppression circuit.

2. Description of the Prior Art

Figure 6:
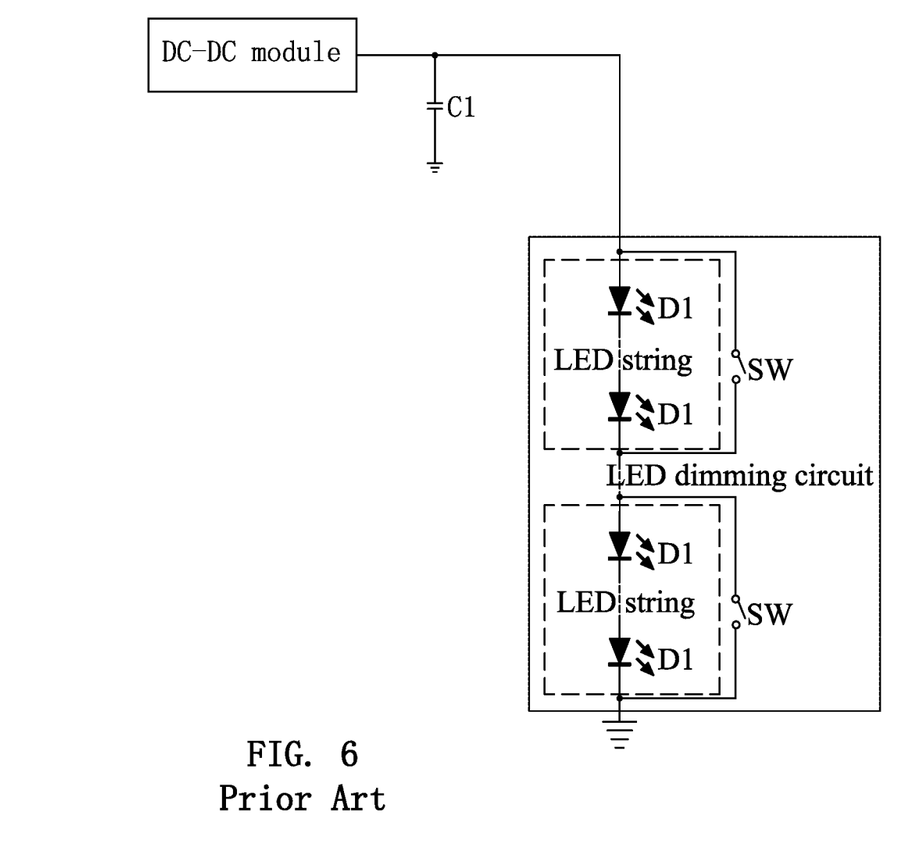
FIG. 6 is a circuit diagram of a conventional LED dimming circuit using a series connection.

In order to solve the negative impact that the dimming of multiple LED strings connected in parallel is difficult, more and more LED strings are connected in series to perform dimming circuits. As shown in FIG. 6, an LED dimming circuit adopting a series connection includes a plurality of LED strings connected in series. Each LED string includes a plurality of LEDs D1 connected in series. Each LED string is connected in parallel with a switching circuit SW. The brightness of each LED string can be controlled by the switching frequency of the switching circuit SW. The LED dimming circuit is generally driven by a DC-DC module. In order to ensure the stability of the DC-DC module, a capacitor is connected in parallel with the output terminal of the DC-DC module, that is, the input terminal of the LED dimming circuit is connected in parallel with a capacitor.

However, there is a problem in the conventional LED dimming circuit adopting a series connection. Since the LED strings are connected in series, when the switching circuit of one LED string is closed and the LED string is turned off, the load voltage of the entire LED dimming circuit is instantaneously increased. The total current of the LED dimming circuit rises, which causes the operating current of the other LED strings to rise instantaneously. Excessive working current will shorten the service life of LEDs D1 and even damage the LEDs D1. Because the input terminal of the LED dimming circuit is connected in parallel with a capacitor, the characteristics of the capacitor will maintain the previous voltage, so that the load voltage of the LED dimming circuit will not drop rapidly, and the operating current of the other LED strings will not drop rapidly to the normal value, making the LEDs D1 more susceptible to damage.

SUMMARY OF THE INVENTION

The primary object of the present invention is to provide an LED dimming load sudden change suppression circuit, which can ensure that the total current of the LED dimming circuit is constant and avoid damage to the LEDs when the load of the LED dimming circuit has a sudden change.

In order to achieve the above object, the solution of the present invention is described below.

An LED dimming load sudden change suppression circuit is applied to an LED dimming circuit. The LED dimming circuit includes a plurality of LED strings connected in series. Each of the LED strings includes a plurality of LEDs D1 connected in series. Each of the LED strings is connected in parallel with a switching circuit SW. The LED dimming circuit is connected in parallel with a capacitor C1. The LED dimming load sudden change suppression circuit comprises a MOS transistor Q1, a sampling resistor R1, an error amplifier U1, and a DC-DC module U2. The MOS transistor Q1 is configured to adjust a total current of the LED dimming circuit according to a voltage signal input to a gate thereof. The sampling resistor R1 is configured to detect the total current of the LED dimming circuit. The error amplifier U1 is configured to compare a voltage across the sampling resistor R1 with a first reference voltage VREF1 to generate a first error signal output to the gate of the MOS transistor Q1. The DC-DC module U2 is configured to control a total input voltage input to the LED dimming circuit and the MOS transistor Q1 according to a voltage between a drain and a source of the MOS transistor Q1.

In an embodiment, the LED dimming load sudden change suppression circuit further comprises a voltage amplifier U3 and another voltage amplifier U4. The MOS transistor Q1 is a PMOS transistor. A voltage output terminal Vout of the DC-DC module U2 is connected to one end of the capacitor C1. One end of the sampling resistor R1 is connected to a non-inverting input terminal of the voltage amplifier U3. Another end of the capacitor C1 is grounded. Another end of the sampling resistor R1 is connected to an inverting input terminal of the voltage amplifier U3. A non-inverting input terminal of the voltage amplifier U4 and the source of the MOS transistor Q1. An output terminal of the voltage amplifier U3 is connected to a non-inverting input terminal of the error amplifier U1. An inverting input terminal of the error amplifier U1 is input with the first reference voltage VREF1. An output terminal of the error amplifier U1 is connected to the gate of the MOS transistor Q1. The drain of the MOS transistor Q1 is connected to an input terminal of the LED dimming circuit and an inverting input terminal of the voltage amplifier U4. An output terminal of the LED dimming circuit is grounded. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

In an embodiment, the LED dimming load sudden change suppression circuit further comprises a voltage amplifier and another voltage amplifier. The MOS transistor Q1 is a PMOS transistor. A voltage output terminal Vout of the DC-DC module U2 is connected to one end of the capacitor C1, the source of the MOS transistor Q1 and a non-inverting input terminal of the voltage amplifier U4. Another end of the capacitor C1 is grounded. The drain of the MOS transistor Q1 is connected to a non-inverting input terminal of the voltage amplifier U3, an inverting input terminal of the voltage amplifier U4 and one end of the sampling resistor R1. Another end of the sampling resistor R1 is connected to an inverting input terminal of the voltage amplifier U3 and an input terminal of the LED dimming circuit. An output terminal of the LED dimming circuit is grounded. An output terminal of the voltage amplifier U3 is connected to a non-inverting input terminal of the error amplifier U1. An inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

In an embodiment, the LED dimming load sudden change suppression circuit further comprises a voltage amplifier. The MOS transistor Q1 is a PMOS transistor. A voltage output terminal Vout of the DC-DC module U2 is connected to one end of the capacitor C1, the source of the MOS transistor Q1 and a non-inverting input terminal of the voltage amplifier U4. Another end of the capacitor C1 is grounded. The drain of the MOS transistor Q1 is connected to an inverting input terminal of the voltage amplifier U4 and an input terminal of the LED dimming circuit. An output terminal of the LED dimming circuit is connected to one end of the sampling resistor R1 and a non-inverting input terminal of the error amplifier U1. Another end of the sampling resistor R1 is grounded. An inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

In an embodiment, the LED dimming load sudden change suppression circuit further comprises a voltage amplifier U3. The MOS transistor Q1 is a PMOS transistor. A voltage output terminal Vout of the DC-DC module U2 is connected to one end of the capacitor C1 and an input terminal of the LED dimming circuit. Another end of the capacitor C1 is grounded. An output terminal of the LED dimming circuit is connected to one end of the sampling resistor R1 and a non-inverting input terminal of the voltage amplifier U3. Another end of the sampling resistor R1 is connected to the drain of the MOS transistor Q1, an inverting input terminal of the voltage amplifier U3 and a voltage feedback terminal FB of the DC-DC module U2. The voltage feedback terminal FB is connected to an inverting input terminal of an error amplifying circuit used for controlling an output voltage of the DC-DC module U2 in the DC-DC module U2. An output terminal of the voltage amplifier U3 is connected to an inverting input terminal of the error amplifier U1. A non-inverting input terminal of the error amplifier U1 is input with the first reference voltage VREF1. An output terminal of the error amplifier U1 is connected to the gate of the MOS transistor Q1. The source of the MOS transistor Q1 is grounded.

In an embodiment, the LED dimming load sudden change suppression circuit further comprises a voltage amplifier U4. The MOS transistor Q1 is an NMOS transistor. A voltage output terminal Vout of the DC-DC module U2 is connected to one end of the capacitor C1 and an input terminal of the LED dimming circuit. Another end of the capacitor C1 is grounded. An output terminal of the LED dimming circuit is connected to the drain of the MOS transistor Q1 and a non-inverting input terminal of the voltage amplifier U4. The source of the MOS transistor Q1 is connected to an inverting input terminal of the error amplifier U1, an inverting input terminal of the voltage amplifier U4 and one end of the sampling resistor R1. Another end of the sampling resistor R1 is grounded. A non-inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

With the above solution, the present invention has two advantages:

1. The voltage change across the sampling resistor R1 of the present invention can reflect the total current change of the LED dimming circuit. Through the error amplifier U1, the voltage across the sampling resistor R1 can be compared with the first reference voltage VREF1 to obtain the first error signal input to the gate of the MOS transistor Q1 and then amplified by the MOS transistor Q1 to form a negative feedback, thereby regulating the current flowing through the MOS transistor to adjust the total current of the LED dimming circuit, so that the total current of the LED dimming circuit is constant. Thus, when the load voltage of the LED dimming circuit suddenly becomes large, the adjustment of the MOS transistor Q1 can keep the operating current of each working LED string unchanged to avoid damage to the LEDs D1.

2. When the load voltage of the LED dimming circuit of the present invention suddenly becomes large, the voltage between the drain and the source of the MOS transistor Q1 increases as the load voltage of the LED dimming circuit increases. At this time, the DC-DC module U2 controls the total input voltage input to the LED dimming circuit and the MOS transistor Q1 to decrease according to the increased voltage between the drain and the source of the MOS transistor Q1. Due to the adjustment of the MOS transistor Q1, the voltage across each working LED string is constant, and thus the voltage between the drain and the source of the MOS transistor Q1 is lowered. Thereby, the voltage between the drain and the source of the MOS transistor Q1 is prevented from being excessively high to damage the MOS transistor Q1.

DETAILED DESCRIPTION OF THE PREFERRED EMBODIMENTS

As shown in FIG. 1 to FIG. 5, the present invention discloses an LED dimming load sudden change suppression circuit, which is applied to an LED dimming circuit. The LED dimming circuit includes a plurality of LED strings connected in series. Each LED string includes a plurality of LEDs D1 connected in series. Each LED string is connected in parallel with a switching circuit SW. The LED dimming circuit is connected in parallel with a capacitor C1.

The LED dimming load sudden change suppression circuit of the present invention comprises a MOS transistor Q1, a sampling resistor R1, an error amplifier U1 and a DC-DC module U2. Wherein, the MOS transistor Q1 is configured to adjust a total current of the LED dimming circuit according to a voltage signal input to a gate thereof. The sampling resistor R1 is configured to detect the total current of the LED dimming circuit. The error amplifier U1 is configured to compare the voltage across the sampling resistor R1 with a first reference voltage VREF1 to generate a first error signal output to the gate of the MOS transistor Q1. The DC-DC module U2 is configured to control a total input voltage input to the LED dimming circuit and the MOS transistor Q1 according to the voltage between a drain and a source of the MOS transistor Q1.

The working principle of the present invention is described below.

The voltage change across the sampling resistor R1 of the present invention can reflect the total current change of the LED dimming circuit. Through the error amplifier U1, the voltage across the sampling resistor R1 can be compared with the first reference voltage VREF1 to obtain the first error signal input to the gate of the MOS transistor Q1 and then amplified by the MOS transistor Q1 to form a negative feedback, thereby regulating the current flowing through the MOS transistor to adjust the total current of the LED dimming circuit, so that the total current of the LED dimming circuit is constant. Thus, when the load voltage of the LED dimming circuit suddenly becomes large, the adjustment of the MOS transistor Q1 can keep the operating current of each working LED string unchanged to avoid damage to the LEDs D1.

When the load voltage of the LED dimming circuit of the present invention suddenly becomes large, the voltage between the drain and the source of the MOS transistor Q1 increases as the load voltage of the LED dimming circuit increases. At this time, the DC-DC module U2 controls the total input voltage input to the LED dimming circuit and the MOS transistor Q1 to decrease according to the increased voltage between the drain and the source of the MOS transistor Q1. Due to the adjustment of the MOS transistor Q1, the voltage across each working LED string is constant, and thus the voltage between the drain and the source of the MOS transistor Q1 is lowered. Thereby, the voltage between the drain and the source of the MOS transistor Q1 is prevented from being excessively high to damage the MOS transistor Q1.

In order to further explain the technical solutions of the present invention, the present invention will be described in detail below through five embodiments.

First Embodiment

Figure 1:
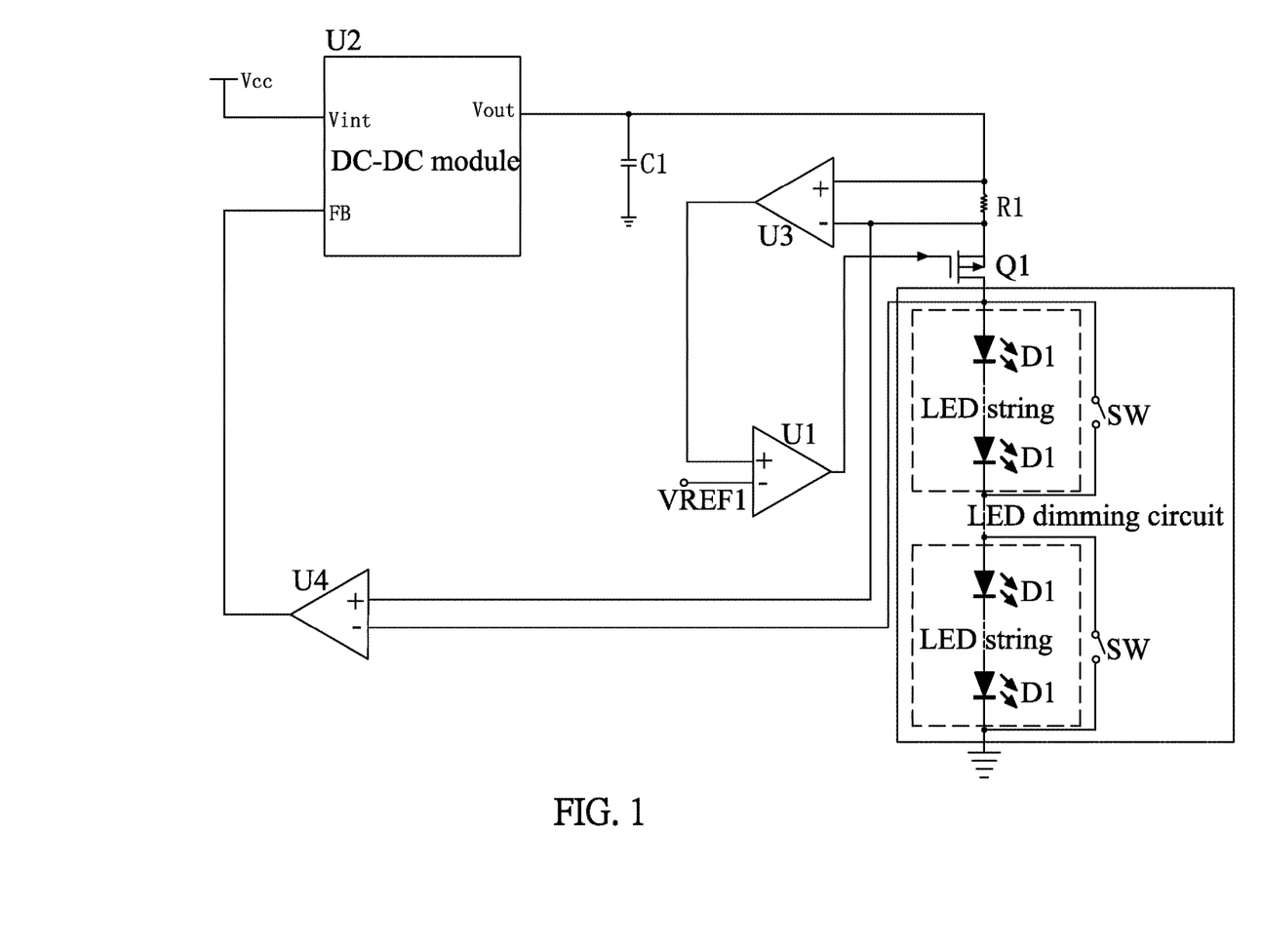
FIG. 1 is a circuit diagram of a first embodiment of the present invention.

As shown in FIG. 1, in the first embodiment, the LED dimming load sudden change suppression circuit of the present invention further includes a voltage amplifier U3 and a voltage amplifier U4. The voltage amplifier U3 and the voltage amplifier U4 are used to collect the voltage across the sampling resistor R1 and the voltage between the drain and the source of MOS transistor Q1, respectively.

Specifically, in this embodiment, the MOS transistor Q1 is a PMOS transistor. A voltage output terminal Vout of the DC-DC module U2 is connected to one end of the capacitor C1. One end of the sampling resistor R1 is connected to a non-inverting input terminal of the voltage amplifier U3. Another end of the capacitor C1 is grounded. Another end of the sampling resistor R1 is connected to an inverting input terminal of the voltage amplifier U3, a non-inverting input terminal of the voltage amplifier U4, and the source of the MOS transistor Q1. An output terminal of the voltage amplifier U3 is connected to a non-inverting input terminal of the error amplifier U1. An inverting input terminal of the error amplifier U1 is input with the first reference voltage VREF1. An output terminal of the error amplifier U1 is connected to the gate of the MOS transistor Q1. The drain of the MOS transistor Q1 is connected to an input terminal of the LED dimming circuit and an inverting input terminal of the voltage amplifier U4. An output terminal of the LED dimming circuit is grounded. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

The error amplifying circuit for controlling the output voltage of the DC-DC module U2 in the DC-DC module U2 is the prior art, and the description will not be repeated here. The present invention can control and set the reference voltage of the non-inverting input terminal of the error amplifying circuit for controlling the output voltage of the DC-DC module U2 in the DC-DC module U2. When the voltage between the drain and the source of the MOS transistor Q1 increases, the DC-DC module U2 stops outputting the voltage, so that the input voltage of the MOS transistor Q1 and the input voltage of the LED dimming circuit are only provided by the capacitor C1. Thus, the voltage across the capacitor C1 drops rapidly, causing the voltage between the drain and the source of the MOS transistor Q1 to decrease. When the voltage between the drain and the source of the MOS transistor Q1 falls within the safe range value, the DC-DC module U2 will start outputting the voltage to the MOS transistor Q1 and the LED dimming circuit. This can prevent the voltage between the drain and the source of the MOS transistor Q1 from being excessively high to damage the MOS transistor Q1.

Second Embodiment

Figure 2:
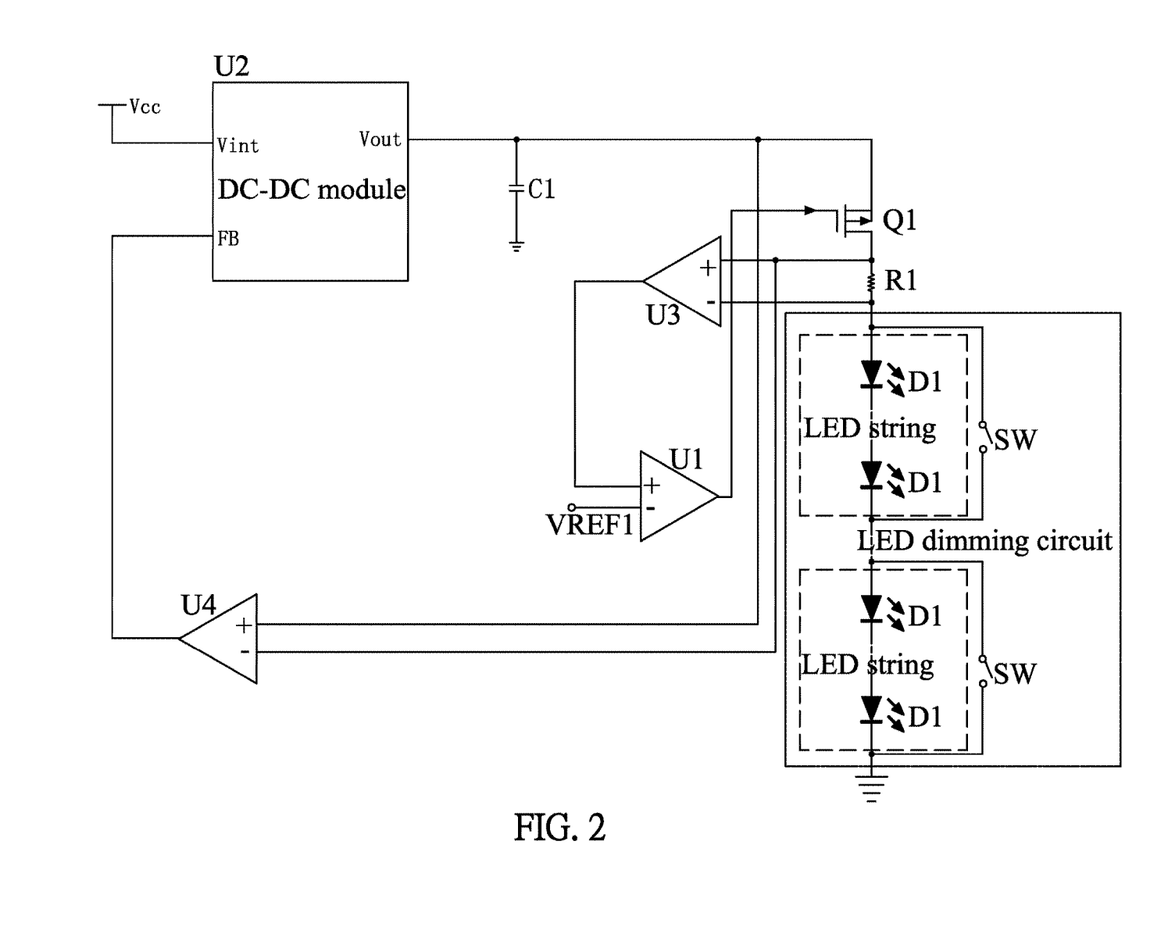
FIG. 2 is a circuit diagram of a second embodiment of the present invention.

As shown in FIG. 2, in the second embodiment, the LED dimming load sudden change suppression circuit of the present invention further includes a voltage amplifier U3 and a voltage amplifier U4. The voltage amplifier U3 and the voltage amplifier U4 are used to collect the voltage across the sampling resistor R1 and the voltage between the drain and the source of MOS transistor Q1, respectively.

Specifically, in this embodiment, the MOS transistor Q1 is a PMOS transistor. A voltage output terminal Vout of the DC-DC module U2 is connected to one end of the capacitor C1, the source of the MOS transistor Q1 and a non-inverting input terminal of the voltage amplifier U4. Another end of the capacitor C1 is grounded. The drain of the MOS transistor Q1 is connected to a non-inverting input terminal of the voltage amplifier U3, an inverting input terminal of the voltage amplifier U4 and one end of the sampling resistor R1. Another end of the sampling resistor R1 is connected to an inverting input terminal of the voltage amplifier U3 and an input terminal of the LED dimming circuit. An output terminal of the LED dimming circuit is grounded. An output terminal of the voltage amplifier U3 is connected to a non-inverting input terminal of the error amplifier U1. An inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

Third Embodiment

Figure 3:
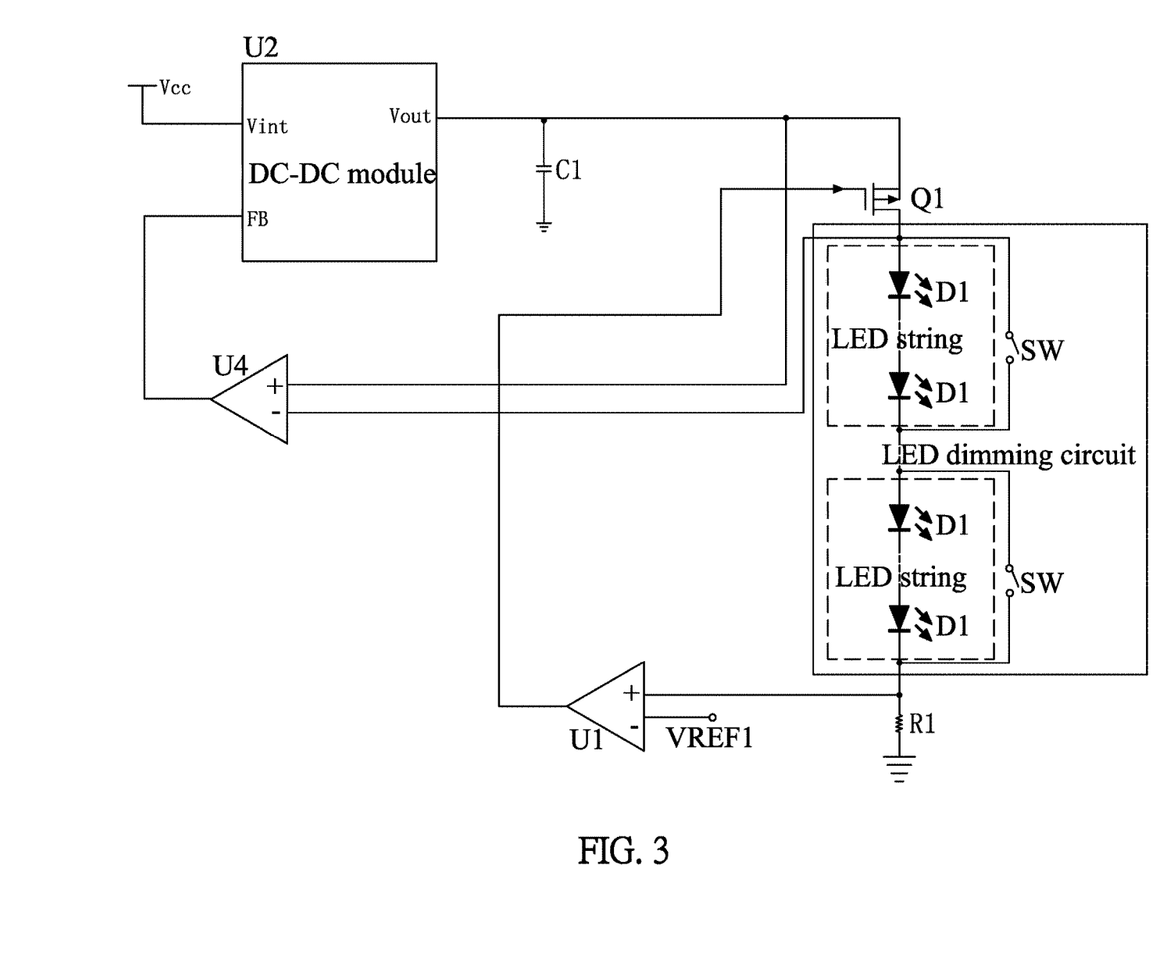
FIG. 3 is a circuit diagram of a third embodiment of the present invention.

As shown in FIG. 3, in the third embodiment, the LED dimming load sudden change suppression circuit of the present invention further includes a voltage amplifier U4.

The voltage amplifier U4 is used to collect the voltage between the drain and the source of MOS transistor Q1.

Specifically, in this embodiment, the MOS transistor Q1 is a PMOS transistor. A voltage output terminal Vout of the DC-DC module U2 is connected to one end of the capacitor C1, the source of the MOS transistor Q1 and a non-inverting input terminal of the voltage amplifier U4. Another end of the capacitor C1 is grounded. The drain of the MOS transistor Q1 is connected to an inverting input terminal of the voltage amplifier U4 and an input terminal of the LED dimming circuit. An output terminal of the LED dimming circuit is connected to one end of the sampling resistor R1 and a non-inverting input terminal of the error amplifier U1. Another end of the sampling resistor R1 is grounded. An inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

Fourth Embodiment

Figure 4:
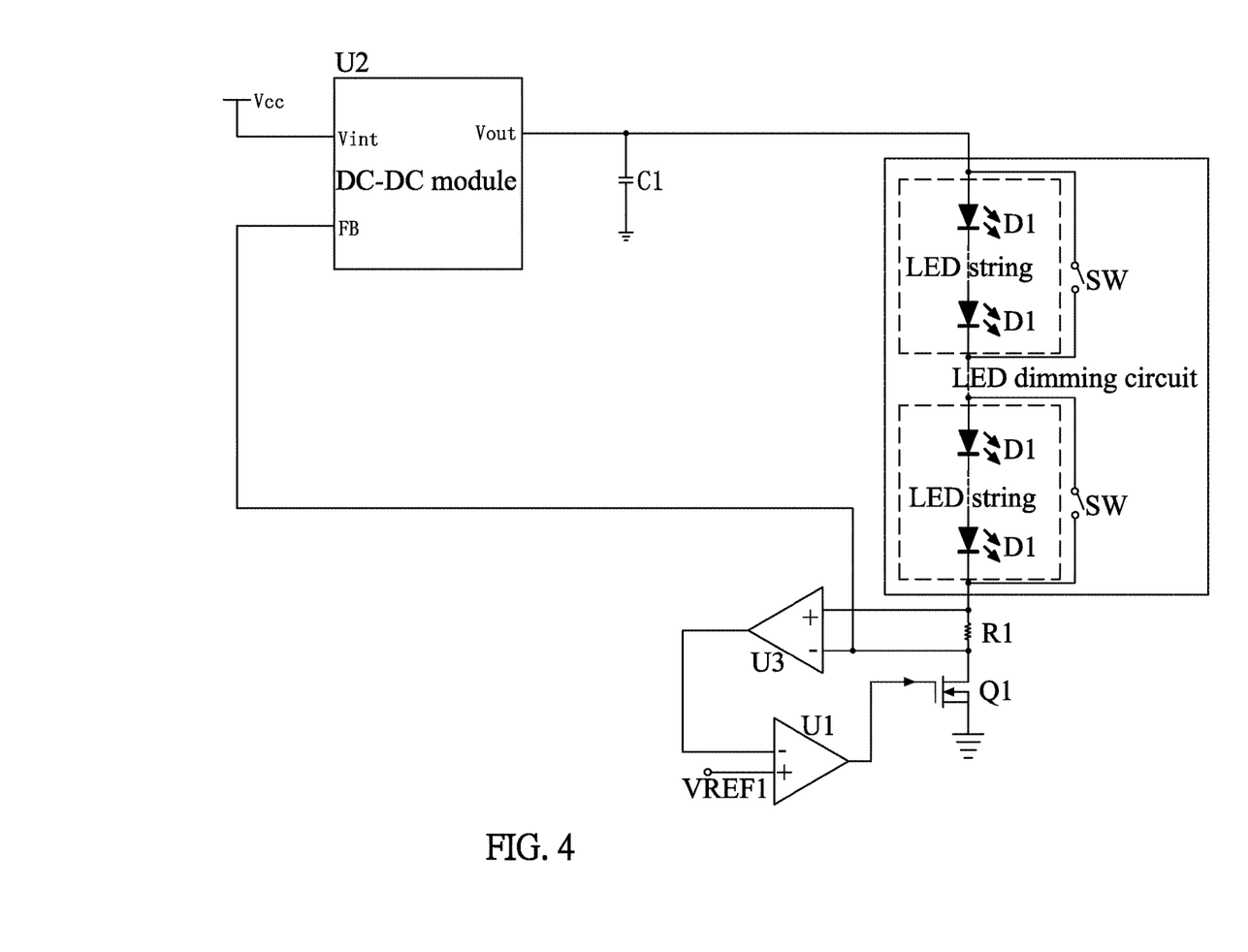
FIG. 4 is a circuit diagram of a fourth embodiment of the present invention.

As shown in FIG. 4, in the fourth embodiment, the LED dimming load sudden change suppression circuit of the present invention further includes a voltage amplifier U3. The voltage amplifier U3 is used to collect the voltage across the sampling resistor R1.

Specifically, in this embodiment, the MOS transistor Q1 is a NMOS transistor. A voltage output terminal Vout of the DC-DC module U2 is connected to one end of the capacitor C1 and an input terminal of the LED dimming circuit. Another end of the capacitor C1 is grounded. An output terminal of the LED dimming circuit is connected to one end of the sampling resistor R1 and a non-inverting input terminal of the voltage amplifier U3. Another end of the sampling resistor R1 is connected to the drain of the MOS transistor Q1, an inverting input terminal of the voltage amplifier U3 and a voltage feedback terminal FB of the DC-DC module U2. The voltage feedback terminal FB is connected to an inverting input terminal of an error amplifying circuit used for controlling an output voltage of the DC-DC module U2 in the DC-DC module U2. An output terminal of the voltage amplifier U3 is connected to an inverting input terminal of the error amplifier U1. A non-inverting input terminal of the error amplifier U1 is input with the first reference voltage VREF1. An output terminal of the error amplifier U1 is connected to the gate of the MOS transistor Q1. The source of the MOS transistor Q1 is grounded.

Fifth Embodiment

Figure 5:
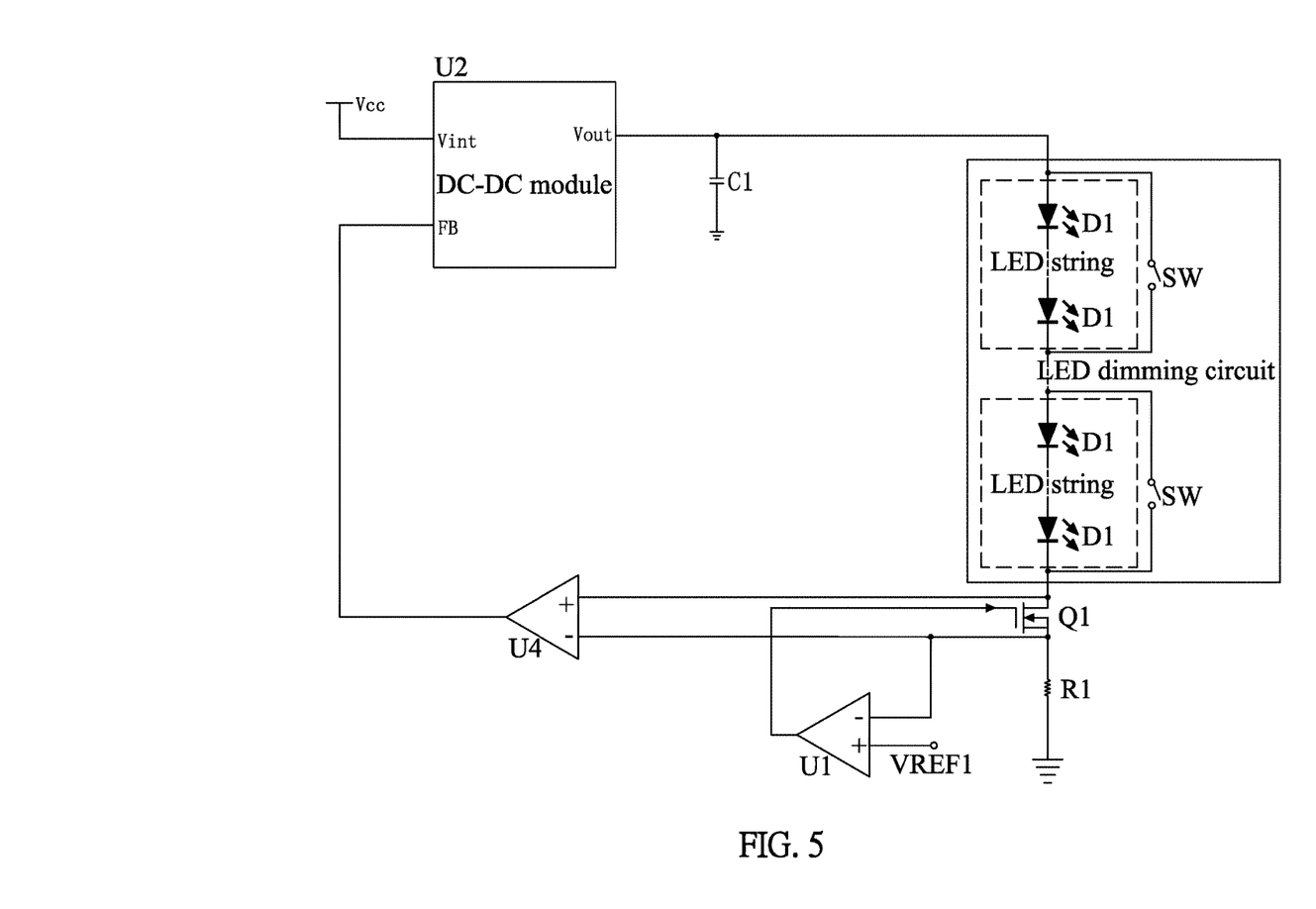
FIG. 5 is a circuit diagram of a fifth embodiment of the present invention.

As shown in FIG. 5, in the fifth embodiment, the LED dimming load sudden change suppression circuit of the present invention further includes a voltage amplifier U4. The voltage amplifier U4 is used to collect the voltage between the drain and the source of MOS transistor Q1.

Specifically, in this embodiment, the MOS transistor Q1 is an NMOS transistor. A voltage output terminal Vout of the DC-DC module U2 is connected to one end of the capacitor C1 and an input terminal of the LED dimming circuit. Another end of the capacitor C1 is grounded. An output terminal of the LED dimming circuit is connected to the drain of the MOS transistor Q1 and a non-inverting input terminal of the voltage amplifier U4. The source of the MOS transistor Q1 is connected to an inverting input terminal of the error amplifier U1, an inverting input terminal of the voltage amplifier U4 and one end of the sampling resistor R1. Another end of the sampling resistor R1 is grounded. A non-inverting input terminal of the error amplifier U1 is input with the first reference voltage VREF1. An output terminal of the error amplifier U1 is connected to the gate of the MOS transistor Q1. An output terminal of the voltage amplifier U4 is connected to a voltage feedback terminal FB of the DC-DC module U2. The voltage feedback terminal FB is connected to an inverting input terminal of an error amplifying circuit used for controlling an output voltage of the DC-DC module U2 in the DC-DC module U2.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED dimming load sudden change suppression circuit, applied to an LED dimming circuit, the LED dimming circuit including a plurality of LED strings connected in series, each of the LED strings including a plurality of LEDs (D1) connected in series, each of the LED strings being connected in parallel with a switching circuit (SW); the LED dimming circuit being connected in parallel with a capacitor (C1); the LED dimming load sudden change suppression circuit comprising:

a MOS transistor (Q1), configured to adjust a total current of the LED dimming circuit according to a voltage signal input to a gate thereof;

a sampling resistor (R1), configured to detect the total current of the LED dimming circuit;

an error amplifier (U1), configured to compare a voltage across the sampling resistor (R1) with a first reference voltage (VREF1) to generate a first error signal output to the gate of the MOS transistor (Q1), a DC-DC module (U2), configured to control a total input voltage input to the LED dimming circuit and the MOS transistor (Q1) according to a voltage between a drain and a source of the MOS transistor (Q1);

a voltage amplifier (U3) and another voltage amplifier (U4); the MOS transistor (Q1) being a PMOS transistor;

a voltage output terminal (Vout) of the DC-DC module (U2) being connected to one end of the capacitor (C1), one end of the sampling resistor (R1) being connected to a non-inverting input terminal of the voltage amplifier (U3), another end of the capacitor (C1) being grounded, another end of the sampling resistor (R1) being connected to an inverting input terminal of the voltage amplifier (U3), a non-inverting input terminal of the voltage amplifier (U4) and the source of the MOS transistor (Q1), an output terminal of the voltage amplifier (U3) being connected to a non-inverting input terminal of the error amplifier (U1), an inverting input terminal of the error amplifier (U1) is input with the first reference voltage (VREF1), an output terminal of the error amplifier (U1) being connected to the gate of the MOS transistor (Q1); the drain of the MOS transistor (Q1) being connected to an input terminal of the LED dimming circuit and an inverting input terminal of the voltage amplifier (U4); an output terminal of the LED dimming circuit being grounded; an output terminal of the voltage amplifier (U4) being connected to a voltage feedback terminal (FB) of the DC-DC module (U2), the voltage feedback terminal (FB) being connected to an inverting input terminal of an error amplifying circuit used for controlling an output voltage of the DC-DC module (U2) in the DC-DC module (U2).

2. The LED dimming load sudden change suppression circuit as claimed in claim 1, further comprising a voltage amplifier (U3) and another voltage amplifier (U4); the MOS transistor (Q1) being a PMOS transistor;

a voltage output terminal (Vout) of the DC-DC module (U2) being connected to one end of the capacitor (C1), the source of the MOS transistor (Q1) and a non-inverting input terminal of the voltage amplifier (U4), another end of the capacitor (C1) being grounded, the drain of the MOS transistor (Q1) being connected to a non-inverting input terminal of the voltage amplifier (U3), an inverting input terminal of the voltage amplifier (U4) and one end of the sampling resistor (R1), another end of the sampling resistor (R1) being connected to an inverting input terminal of the voltage amplifier (U3) and an input terminal of the LED dimming circuit, an output terminal of the LED dimming circuit being grounded; an output terminal of the voltage amplifier (U3) being connected to a non-inverting input terminal of the error amplifier (U1), an inverting input terminal of the error amplifier (U1) being input with the first reference voltage (VREF1), an output terminal of the error amplifier (U1) being connected to the gate of the MOS transistor (Q1); an output terminal of the voltage amplifier (U4) being connected to a voltage feedback terminal (FB) of the DC-DC module (U2), the voltage feedback terminal (FB) being connected to an inverting input terminal of an error amplifying circuit used for controlling an output voltage of the DC-DC module (U2) in the DC-DC module (U2).

3. The LED dimming load sudden change suppression circuit as claimed in claim 1, further comprising a voltage amplifier (U4); the MOS transistor (Q1) being a PMOS transistor;

a voltage output terminal (Vout) of the DC-DC module (U2) being connected to one end of the capacitor (C1), the source of the MOS transistor (Q1) and a non-inverting input terminal of the voltage amplifier (U4), another end of the capacitor (C1) being grounded, the drain of the MOS transistor (Q1) being connected to an inverting input terminal of the voltage amplifier (U4) and an input terminal of the LED dimming circuit, an output terminal of the LED dimming circuit being connected to one end of the sampling resistor (R1) and a non-inverting input terminal of the error amplifier (U1), another end of the sampling resistor (R1) being grounded; an inverting input terminal of the error amplifier (U1) being input with the first reference voltage (VREF1), an output terminal of the error amplifier (U1) being connected to the gate of the MOS transistor (Q1); an output terminal of the voltage amplifier (U4) being connected to a voltage feedback terminal (FB) of the DC-DC module (U2), the voltage feedback terminal (FB) being connected to an inverting input terminal of an error amplifying circuit used for controlling an output voltage of the DC-DC module (U2) in the DC-DC module (U2).

4. The LED dimming load sudden change suppression circuit as claimed in claim 1, further comprising a voltage amplifier (U3), the MOS transistor (Q1) being a NMOS transistor;

a voltage output terminal (Vout) of the DC-DC module (U2) being connected to one end of the capacitor (C1) and an input terminal of the LED dimming circuit, another end of the capacitor (C1) being grounded;

an output terminal of the LED dimming circuit being connected to one end of the sampling resistor (R1) and a non-inverting input terminal of the voltage amplifier (U3), another end of the sampling resistor (R1) being connected to the drain of the MOS transistor (Q1), an inverting input terminal of the voltage amplifier (U3) and a voltage feedback terminal (FB) of the DC-DC module (U2), an output terminal of the voltage amplifier (U3) being connected to an inverting input terminal of the error amplifier (U1), a non-inverting input terminal of the error amplifier (U1) being input with the first reference voltage (VREF1), an output terminal of the error amplifier (U1) being connected to the gate of the MOS transistor (Q1), the source of the MOS transistor (Q1) being grounded.

5. The LED dimming load sudden change suppression circuit as claimed in claim 1, further comprising a voltage amplifier (U4), the MOS transistor (Q1) being an NMOS transistor;

a voltage output terminal (Vout) of the DC-DC module (U2) being connected to one end of the capacitor (C1) and an input terminal of the LED dimming circuit, another end of the capacitor (C1) being grounded;

an output terminal of the LED dimming circuit being connected to the drain of the MOS transistor (Q1) and a non-inverting input terminal of the voltage amplifier (U4), the source of the MOS transistor (Q1) being connected to an inverting input terminal of the error amplifier (U1), an inverting input terminal of the voltage amplifier (U4) and one end of the sampling resistor (R1), another end of the sampling resistor (R1) being grounded; a non-inverting input terminal of the error amplifier (U1) being input with the first reference voltage (VREF1), an output terminal of the error amplifier (U1) being connected to the gate of the MOS transistor (Q1); an output terminal of the voltage amplifier (U4) being connected to a voltage feedback terminal (FB) of the DC-DC module (U2).

\* \* \* \* \*